Patented May 27, 1924.

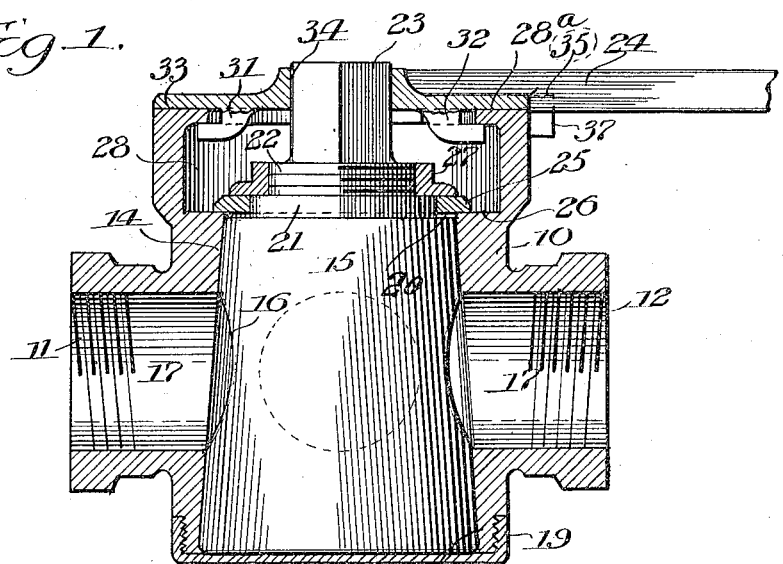
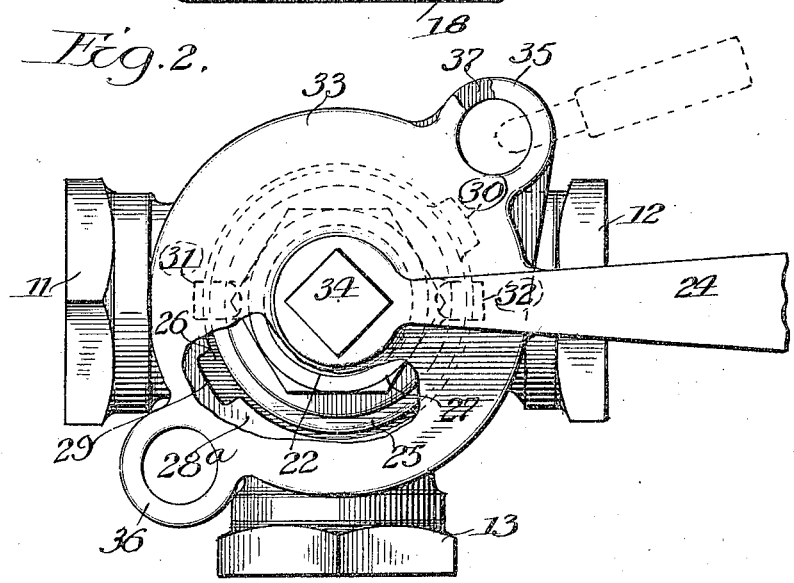

1,495,630

UNITED STATES PATENT OFFICE.

WILLIAM H. BEES, OF CHICAGO, ILLINOIS, ASSIGNOR TO ATLAS COPPER & BRASS MFG. CO., OF CHICAGO, ILLINOIS, A CORPORATION OF ILLINOIS.

LOCK VALVE.

Application filed October 4, 1920. Serial No. 414,637.

*To all whom it may concern:*

Be it known that I, WILLIAM H. BEES, a citizen of the United States, residing at Chicago, in the county of Cook and State of Illinois, have invented a certain new and useful Improvement in Lock Valves, of which the following is a full, clear, concise, and exact description, reference being had to the accompanying drawings, forming a part of this specification.

The invention relates to improvements in lock valves, such as shown and claimed in the Patent No. 1,014,203, issued to me January 9, 1912, in which a structure is shown whereby the valve may be actuated so that it will assume various positions and be locked in said positions.

In this structure the valve is held within the casing by a member having a handle which is provided with means for engaging the casing to rotatably hold the handle with relation to the casing. This structure also has means for taking up any wear between the valve and the casing.

In the structure of this device the first mentioned means and the latter are exposed so that access thereto may be had. This arrangement might permit persons having malicious intentions to manipulate the parts so that relative movement between them might result, which allows leakage between the parts to take place and permits the escape of the commodity which it is desired to confine.

It is an object of the present invention to design and arrange the elements entering into the structure so that they will be enclosed or confined and be inaccessible and incapable of any unauthorized manipulation whatsoever, but which is capable of actuation, separation and adjustment by persons in authority.

It is a further object of the invention to accomplish these and other objects in a simple and inexpensive manner, all of which will be more clearly understood when read in conjunction with the accompanying drawings, in which—

Fig. 1 is a central section of a valve having the invention applied thereto;

Fig. 2 is a plan view of the structure shown in Fig. 1, showing a portion broken away for the purpose of illustration.

The invention is herein shown and described in conjunction with what is generally known as a three-way valve, it being understood, however, that its adaptation is not limited to this or any other number of passages, as the invention may be applied with equal facility to a valve having any other desired number.

The valve casing 10 is in this instance provided with the three threaded extensions or bosses 11, 12 and 13, which provide coupling members whereby the valve casing may be coupled in the usual manner with pipe connections. This valve casing 10 is further provided with the transverse opening 14 within which the valve plug 15 is rotatably arranged. This plug is provided with the passages 16 which may be caused to communicate with the various passages 17 which lead to the passages of the bosses 11 to 13, or may be positioned to close these passages and prevent the flow of the fluid through the valve. The lowermost end 18 of the valve casing is open to permit the plug to be inserted into the casing and is closed by the cap 19 which is screw threadedly attached to said casing. The transverse opening 14 and the valve plug are each tapered to fit, the larger dimension being arranged adjacent the lowermost end of the casing 10. The uppermost or smaller end of the valve plug is provided with the shouldered portion 20, the annular integral collar 21, the threaded portion 22 and the squared extension 23, the latter of which projects beyond the uppermost end of the casing to permit the handle 24 to be cooperatively connected thereto. An annular member 25 is arranged upon the shouldered portion 20 and extends beyond the periphery of the uppermost end of the plug and rests upon the inwardly projecting annular portion 26 of the valve casing. A clamping ring 27 rests upon the collar 21 and engages the annular member 25, and by virtue of its threaded connection with the threaded portion 22 causes the valve plug to tightly fit the transverse opening and also permits any wear to be taken up so that said plug will at all times properly fit the opening and maintain a leakproof connection. The uppermost end of the valve casing is enlarged to form the chamber 28 and has confined therein the various elements just referred to. The uppermost end of this chamber 28 is provided with an inwardly projecting annular flange 28$^a$, which is provided with the diametrically opposed notches or recesses 29 and 30, for the reception of the diametrically opposed lugs or projections 31 and 32 provided upon the underside of the rotatable cover plate 33, the latter being provided with the squared opening 34 for the reception of the squared extension 23. This cover plate is provided with the handle 24 and a pair of apertured lugs 35 and 36 which are also diametrically opposed to each other, but offset with relation to the lugs 31 and 32 provided upon the under side of the cover plate. These last named apertured lugs 35 and 36 are arranged so that either of them may be brought into register with the apertured lug 37 provided upon the outer portion of the uppermost end of the valve casing, so as to permit the shackle of a padlock to be passed through the apertures and locked to prevent the relative rotation of the cover plate and casing, thereby holding the valve in any of its various positions.

It is, of course, understood that the position of the notches or recesses in the flange 28ª and the projections 31 and 32 provided upon the under side of the cover plate are arranged with respect to each other and the ports in the valve plug so that when the latter is in any of its operative positions the separation of the cover plate and the valve casing is prevented, but may be positioned so as to permit the disassociation of the cover plate and casing, to allow of access to the parts associated with the uppermost end of the valve plug to permit the plug to be adjusted or these parts removed from the plug or the casing, to thereby permit the plug to be drawn through the opening provided at the lowermost extremity of the valve casing.

From the foregoing explanation of the structure, it is apparent that even though the cap 19 is removed from the lowermost end of the casing the valve plug cannot be manipulated so as to cause leakage of the fluid between it and the casing, as the parts which hold the valve plug in position are confined in the chamber provided at the uppermost end of the casing, which is closed by the rotatable cover plate.

It is also evident that the lugs provided for rotatably holding the cover plate in position are also inaccessible, so that they cannot be bent or otherwise tampered with because these are also arranged in this chamber. Therefore in order to gain access to the parts or to operate them the lock which holds the parts in adjusted relation must be either unlocked or broken, as the structure absolutely insures against bending, forcing or othewise manipulating the parts to permit leakage between the plug and casing.

Having thus described the invention it is obvious that changes and modifications may be resorted to without departing from the spirit of the invention as expressed in the appended claims.

What I claim and desire to cover by Letters Patent is:

1. In a device of the class described the combination of a valve casing and a valve rotatably arranged in said casing, a rotatable closure for one end of the casing, said closure having a handle and having means for engaging the valve, said casing having an inwardly projecting flange arranged below the closure and said closure having a lug cooperating with the flange to rotatably hold the closure with relation to the casing.

2. In a device of the class described the combination of a valve casing and a valve rotatably arranged in said casing, a rotatable closure for one end of the casing, said closure having a handle and having means for engaging the valve, said casing having an inwardly projecting annular flange arranged below the closure, said flange having a recess, a lug provided upon the closure constructed to be passed through the recess and turned to engage the flange to secure the closure to the casing, said flange and lug cooperating to rotatably hold the closure to the casing and said closure and casing having cooperating means constructed to receive means for locking the closure against rotation.

3. In a device of the class described the combination of a valve casing, a rotatable closure for one end of the valve casing, a valve arranged in the casing, said valve having a tapered portion the smaller dimension thereof projecting towards the closure, said closure having means for engaging the valve and forming a means for rotating said valve, said closure and casing having cooperating means for rotatably securing the closure to the casing, said means being arranged within the casing and means whereby said closure may be locked against rotation.

4. In a device of the class described the combination of a valve casing and a valve rotatably arranged therein, means for supporting the valve in the casing, said means being arranged within the casing, an extension projecting from the valve, a rotatable closure for the casing, said closure being connected to the extension of the valve and having means cooperating with the casing for rotatably and removably connecting the closure and the casing, said means being arranged within the casing.

5. In a device of the class described the combination of a valve casing and a valve rotatably arranged therein, said valve being tapered and having its smallest dimension terminating within the casing, means for supporting the valve in the casing, said means being connected to said end of the valve and being arranged within the casing, a closure for said end of the casing, said closure being rotatable and having means for engaging the valve, said closure and casing having cooperating means for detachably connecting said closure and casing together, said last mentioned means being also arranged within the casing.

6. In a device of the class described the combination of a valve casing and a valve rotatably arranged therein, said valve being tapered and having its smallest dimension terminating within the casing, means for supporting the valve in the casing, said means being connected to said end of the valve and being arranged within the casing, a closure for said end of the casing, said closure being rotatable and having means for engaging the valve, said closure and casing having cooperating means for detachably connecting said closure and casing together, said last mentioned means being arranged within the casing and said closure and casing having cooperating means, whereby the closure may be locked against rotation.

7. In a device of the class described the combination of a valve casing having a tapered bore and a chamber arranged at the smallest end of the tapered bore, said chamber having an inwardly projecting annular flange having diametrically opposed recesses, a tapered valve plug arranged in said bore, means for supporting the plug in said bore, a closure for the chambered end of the casing, said closure being connected to the valve and providing means for rotating the same, said closure having means which cooperates with the flange of the chamber for detachably securing said closure to the casing, and said closure and casing having cooperating means whereby said closure may be locked against rotation.

8. In a device of the class described the combination of a valve casing having an inlet and outlet passage, a valve controlling said passage, a chamber arranged adjacent one end of the valve, means provided in the chamber and associated with the valve for rotatably holding the valve with relation to the casing a rotatable closure for the chamber, means arranged in the chamber for rotatably securing the closure to the casing, a connection between the closure and said valve whereby said valve may be rotated with the closure and means whereby the valve and closure may be locked against rotation.

9. In a device of the class described the combination of a valve casing having an inlet and outlet passage, a valve controlling said passage, a chamber arranged adjacent one end of the valve, means provided in the chamber and associated with the valve for rotatably holding the valve with relation to the casing, a rotatable closure for the chamber, means arranged in the chamber for rotatably securing the closure to the casing, a connection between the closure and said valve whereby said valve may be rotated with the closure and means whereby the valve and closure may be locked against rotation with the valve in open and closed positions.

10. In a device of the class described the combination of a valve casing having an inlet and outlet passage, a valve controlling said passage, a chamber arranged adjacent one end of the valve, means provided in the chamber and associated with the valve for rotatably holding the valve with relation to the casing, a rotatable closure for the chamber, means arranged in the chamber for rotatably securing the closure to the casing, a connection between the closure and said valve, whereby said valve may be rotated with the closure, said closure and casing having cooperating means whereby relative movement thereof is prevented, and means whereby the valve and closure may be locked against rotation.

11. In a device of the class described the combination of a valve casing having an inlet and outlet passage, a valve controlling said passage, a chamber arranged adjacent one end of the valve, means provided in the chamber and associated with the valve for rotatably holding the valve with relation to the casing, means arranged in the chamber for adjusting the valve, a rotatable closure for the chamber, means arranged in the chamber for rotatably securing the closure to the casing, a connection between the closure and said valve whereby said valve may be rotated with the closure and means whereby the valve and closure may be locked against rotation.

In witness whereof, I hereunto subscribe my name this 23rd day of September A. D., 1920.

WILLIAM H. BEES.